Dec. 20, 1938.　　　　　A. SEIDL　　　　　2,140,815
NEST
Filed March 21, 1936
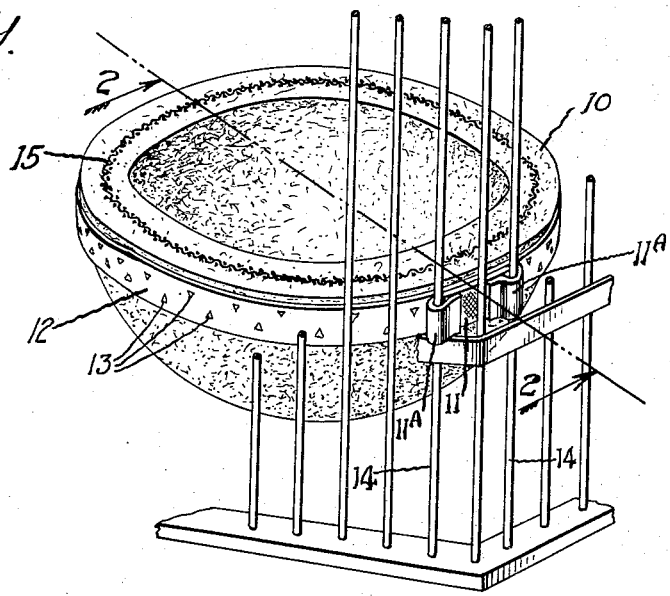
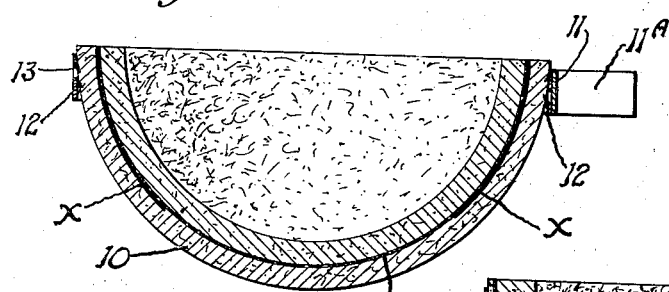
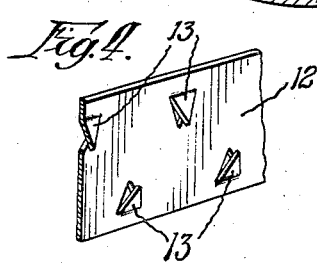
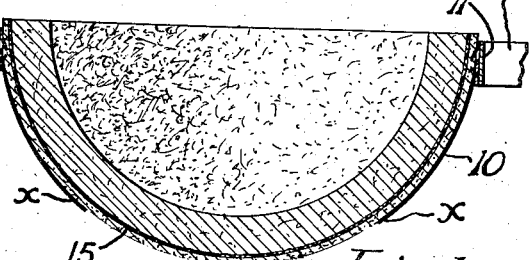
Witness:
E. Camporini
Inventor:
Anton Seidl
By Frank J. Shraeder Jr.
Attorney.

Patented Dec. 20, 1938

2,140,815

UNITED STATES PATENT OFFICE 2,140,815

NEST

Anton Seidl, Chicago, Ill.

Application March 21, 1936, Serial No. 70,070

1 Claim. (Cl. 119—45)

This invention relates generally to improvements in nests and has particular reference to canary nests, and to the method of making same.

Heretofore canary nests were commonly made from loose animal hair, or sometimes of loose cotton, or dried weeds or grass mixed with long cotton strings and packed by hand against the inner side of a wire mesh basket, or these materials were placed on the bottom of the cage and the bird was permitted to build her own nest in a suitable container or box or basket supported in the cage. Due to the loose construction of such nesting materials, the nests made in this manner from such loose materials are subject to the tendency or habit of birds to pull on the strings and other loose fibers to thereby disrupt and destroy the form of such nest bodies, to scatter such loosely held material in the cage, and in many cases the eggs were easily displaced or thrown out of the nest and destroyed by the bird in her pull on the long string-like elements of the nest body.

One of the objects of my invention resides in the adaption of a composition of matter to form a compact, pressed, or pre-formed semi-spherical concave nest body for insertion and support on a simple substantially circular supporting member or band having means for attaching it to a part of the cage.

Another object of my invention is found in the provision of a supporting member for the nest body constituting a flat band having inwardly pressed-out prongs adapted to secure the nest body against vertical displacement by the bird.

Still another object of my invention resides in the novel adaptation of a compressed composition of matter such as for instance, felt, into a pre-formed nest body; such composition of matter including animal hair, as goat hair, wool, and vegetable matter, such as cotton and hemp fibers, and in some nest bodies reenforcing of burlap fabric.

A further object of my invention is found in the novel method of making bird nests including preferably sizing a portion of the composition of the nest body to thereby sufficiently stiffen the body to facilitate retainment of its form and still provide an unsized portion, preferably at the lower central portion thereof, for necessary ventilation purposes.

A still further object of my invention is found in the production of a compact pre-formed nest body which is not easily disrupted by the habit of birds in pulling of the fibers or strings; such resistance to disruption of my improved nest body being in the use therein of comparatively short and fine animal and vegetable fibers compressed into the nest body.

With the above and other objects in view, my invention consists in the novel method and construction of a bird nest and in the composition of the insertable nest body as shown in preferred embodiment in the attached drawing, described in the following specification, and particularly pointed out in the appended claim.

In the attached drawing:

Fig. 1 is a perspective view of a corner portion of a cage showing a nest embodying my invention;

Fig. 2 illustrates a vertical cross-section of the nest taken on line 2—2 of Fig. 1;

Fig. 3 illustrates a vertical cross-section similar to that shown in Fig. 2 but of a slightly modified form of nest body, and Fig. 4 is an enlarged perspective view of a portion of the nest supporting band member showing the prongs for retaining the nest body.

While the nest body generally indicated by 10 can be readily inserted in the commonly used wire mesh nest baskets, or in any other suitable support, I prefer to show in the attached drawing, a support for the nest body 10, which generally may be described as a circular member, bar, or flat band 12 having means for retaining the nest body 10 against vertical displacement preferably constituting a plurality of spaced integral prongs 13 punched inwardly of the band in spaced circularly arranged oppositely disposed groups of prongs, that is, one circular group of prongs being bent angularly in a downward direction and the other group of prongs being bent angularly upwardly.

The supporting member 12 may be made of a flat comparatively thin metal band bent into preferably circular form, the ends thereof being held in abutment by means of a short thin U-shaped metallic connection strip 11 spot-welded, or otherwise secured, to the ends of the band 12. The free ends 11A of the strip 11 are adapted to be bent around a pair of the wire cage bars 14 to thus securely support the band 12 and nest body 10 in the cage.

The body 10 may be made from felt, or preferably a compressed composition of matter including animal hair, such as goat hair, wool, and vegetable matter such as fine cotton fibers and if desirable a small proportion of hemp fibers, jute, flax, or manila. Such composition, if so desirable, may include an intermediate layer or layers of burlap reenforcing 15 as indicated in Figs. 2 and 3.

The material constituting the nest body 10 is compressed into a flat sheet of about one-half inch thickness and cut into circular form about the size of the finished formed body. Then suitable sizing is applied, as with a brush, to a peripheral circular portion, in the form of an annulus, on one side of the circular form of the material, leaving a circular central portion unsized for ventilation purposes above stated.

The sized circular piece of material is then mounted between a pair of ventilated forming dies which are placed in a hot air dryer for sufficient time to partially dry the sizing and set the finished form of the body which may be defined as a semi-spherical hollow or concave body. If the temperature in the dryer is about 100° F., such partial drying will require about 10 minutes. Obviously, such period of partial drying will vary with the kind of sizing used and the thickness of its application. After the nest body has been completely dried in atmosphere the peripheral edge is trimmed to remove any loose or uneven parts or fibers.

In the drawing, the sized portion is diagrammatically indicated by a full even arcuate line marked X.

I prefer to use either of the following mixtures of materials for the composition forming the nest body:
For example:

I. A compressed mixture of fibers consisting of:

| | Per cent by weight |
|---|---|
| Goat hair | 75 |
| Wool | 6 |
| Cotton | 8 |
| Vegetable fibers such as flax, manila or preferably hemp | 11 | or:

II. A compressed mixture of fibers consisting of:

| | Per cent by weight |
|---|---|
| Mottled white and brown cattle hair | 88 |
| Reenforcing of burlap, or fabric or other woven vegetable matters | 12 | or:

III. A compressed mixture of fibers consisting of:

| | Per cent by weight |
|---|---|
| Goat hair | 88 |
| Reenforcing of burlap or fabric, or other woven vegetable matter | 12 | or:

IV. A compressed mixture of fibers consisting of:

| | Per cent by weight |
|---|---|
| Cotton | 44 |
| Flax | 44 |
| Reenforcing of burlap or fabric, or other woven vegetable matter | 12 |

Obviously, the proportions given may vary and where the composition is reenforced with burlap, the layer or layers of burlap may be interposed within any section of the cross-section of the composition body but preferably in about the middle of the thickness of the body or near the outer side of the finished body. Also, the sizing may be applied on a portion of the outer side of the body, or on a portion of an intermediate layer of the body or on the reenforcing burlap.

Furthermore, the body may be made of two or more layers of different composition, as for example, an inner layer of the composition identified above as III and an outer layer of the composition marked II; or as another example, an inner layer of composition marked I, and an outer layer of composition marked II, as for illustration shown in Fig. 2, which shows a nest body made of two layers of material with an intermediate section of vegetable fabric or burlap reenforcing.

Fig. 3 shows a single layer of one of the compositions reenforced near its outer face with wool or cotton fabric or burlap.

The sizing may be glue or preferably a mixture of boiled starch and glue in proportions of ⅔ starch and ⅓ glue.

While the supporting member 12 is shown and described as having the connection piece 11 welded to the circular band portion 12, it is obvious that this piece 11 could be secured to the circular portion by means of integral portions cut from the body of the circular band and inserted in slots in the connection piece and then bent over to securely retain the connection piece on the band end portions.

The connection piece 11 could also be eliminated by cutting a pair of slots in opposite sides of the band 12, which slots would extend from the edges of the band to the center of the band. These slots would be cut near the ends of the band and would permit the end portions of the band to intersect one another through such slots to form a halved connection of the band near the end portions.

I claim:

A bird's nest comprising a semi-spherical body of fibrous material, said body having an annular sized portion and a non-sized ventilating central portion, and a band surrounding said body and having prongs some of which have their free ends directed upwardly and others have their free ends directed downwardly and engaging in the peripheral portion of the body.

ANTON SEIDL.